US008566169B2

(12) United States Patent
Bohanan et al.

(10) Patent No.: US 8,566,169 B2
(45) Date of Patent: Oct. 22, 2013

(54) VIRTUAL GIFT CARD

(75) Inventors: Yvette Marie Bohanan, Charlotte, NC (US); Jason P. Blackhurst, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,074

(22) Filed: Jan. 1, 2012

(65) Prior Publication Data
US 2013/0018778 A1 Jan. 17, 2013

Related U.S. Application Data

(60) Provisional application No. 61/508,410, filed on Jul. 15, 2011.

(51) Int. Cl.
*G06Q 30/00* (2012.01)
*G06Q 40/00* (2012.01)

(52) U.S. Cl.
USPC .............................................. 705/26; 705/35

(58) Field of Classification Search
USPC ....................................................... 705/35, 26
See application file for complete search history.

(56) References Cited

U.S. PATENT DOCUMENTS

| 5,984,180 | A | * | 11/1999 | Albrecht ........................ 235/380 |
| 6,175,823 | B1 | * | 1/2001 | Van Dusen .................. 705/26.81 |
| 2004/0083184 | A1 | | 4/2004 | Tsuei et al. |
| 2004/0260653 | A1 | | 12/2004 | Tsuei et al. |
| 2005/0199712 | A1 | * | 9/2005 | Rosenblatt .................... 235/381 |
| 2006/0036539 | A1 | | 2/2006 | Tombroff |
| 2008/0086410 | A1 | * | 4/2008 | MacGuire ...................... 705/38 |
| 2008/0162318 | A1 | | 7/2008 | Butler et al. |

OTHER PUBLICATIONS

Gines, Karen; "Gift certificates: An award of one's own"; Incentive, suppl. Gift Certificate; Feb. 1999.*
PR_Newswire; "GiftCertificates.com Enters Agreement as Premier Gift Certificate Vendor Across Lycos Network"; Nov. 3, 1999.*
Lucas, Jennifer M., et al., U.S. Appl. No. 13/472,771, filed May 16, 2012.

* cited by examiner

*Primary Examiner* — Edward Chang
(74) *Attorney, Agent, or Firm* — Michael A. Springs; Moore & Van Allen PLLC; James C. Edwards

(57) ABSTRACT

A virtual gift credit system that automatically attaches gift credit to a payment account or vehicle of the gift recipient upon issuance of the gift credit is herein described. By attaching the gift credit amount to the recipient's payment account, subsequent purchases made using the payment account, and of the type associated with the gift credit, are automatically settled by applying the gift credit amount to the purchase amount. Further, the invention does not require gift recipients to share confidential account information with gift providers in order for the gift providers to bestow gift credit upon the gift recipients. Through the use of aliases, which serve to tie an identifier, such as a gift recipient's telephone number, email address or the like to a gift recipient's payment account, the invention does not require that the gift provider know any information about the financial accounts of the intended gift recipient.

36 Claims, 8 Drawing Sheets

VIRTUAL GIFT CARD

CLAIM OF PRIORITY UNDER 35 U.S.C. §119

The present Application for Patent claims priority to Provisional Application No. 61/508,410 entitled "Virtual Gift Card" filed Jul. 15, 2011, and assigned to the assignee hereof and hereby expressly incorporated by reference herein.

FIELD

In general, embodiments herein disclosed relate to commerce and, more specifically providing virtual gift credit that automatically attaches to a gift recipient's payment account upon determination that an alias provided by the gift provider is registered with the payment account.

BACKGROUND

Most merchants have replaced traditional gift certificates with gift cards, which are credit card-like in design and allow for the merchant to program the magnetic strip in the amount that the gift-providing customer desires. In the online realm, merchants provide gift credit in the form of gift codes, which upon purchase may be electronically communicated, via email or the like, to the gift-recipient.

In either instance, the gift recipient must remember to bring the gift card to the merchant or remember the gift code or location of the gift code when redeeming the credit towards a subsequent purchase. In many instances the recipient of a gift card may forget to bring the card with them to the associated merchant or otherwise forget that they have an outstanding gift card for that particular merchant. Likewise, the recipient of a gift code may be unable to locate the gift code or may have deleted the gift code communication prior to redeeming the gift code.

Therefore, a need exists to develop systems, methods, computer program products and the like that allows for gift-providing customers to gift credit to a gift-recipient, such that upon receipt of the credit, the gift-recipient can ostensibly forget that they have the credit yet subsequently have the credit automatically applied towards future purchases. In effect, the desired invention eliminates the need for the gift-recipient to remember to bring a gift card or gift code to a merchant and, moreover, allows the gift-recipient to redeem the credit even if they forget that they have the gift credit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later Embodiments of the present invention describe an innovative virtual gift credit system that provides for gift credit to be automatically attached to a payment account or vehicle of the gift recipient upon issuance of the gift credit. By attaching the gift credit amount to the recipient's payment account/vehicle subsequent purchases made using the payment account/vehicle, and of the type associated with the gift credit, (e.g., purchases at the specified merchant associated with the gift credit) are automatically settled by applying the gift credit amount to the purchase amount. As such, the present system insures that the gift credit will be used by the gift recipient even if the gift recipient forgets that they are possession of the gift credit.

Additionally, embodiments of the present invention do not require gift recipients to share confidential account information with gift providers in order for the gift providers to bestow gift credit upon the gift recipients. In fact, through the use of aliases, which serve to tie an identifier, such as a gift recipient's telephone number, email address or the like to a gift recipient's payment account/vehicle, embodiments of the invention do not require that the gift provider know any information about the financial accounts of the intended gift recipient.

A method for providing virtual gift credit defines first embodiments of the invention. The method includes receiving gift credit instructions that include a gift credit type, gift credit amount and an alias associated with a gift recipient. The method further includes determining that the alias is registered with a payment account associated with the gift recipient; and attaching the gift credit amount to the payment account based on determination that the alias is registered with the payment account. In further specific embodiments the method includes automatically applying the gift credit amount to a purchase made against the payment account based on the purchase being associated with the gift card type.

A system for providing virtual credit defines second embodiments of the invention. The system includes a computer apparatus including a processor and a memory. The system additionally includes a virtual gift module stored in the memory, executable by the processor and configured to receive gift credit instructions that include gift credit type, gift credit amount and alias associated with a gift recipient. The system further includes a gift recipient account determination module stored in the memory, executable by the processor and configured to determine that the alias is registered with a payment account associated with the gift recipient. In addition, the system includes a gift credit attachment module stored in the memory, executable by the processor and configured to attach the gift credit amount to the payment account based on determination that the alias is registered with the payment account. In additional embodiments of the system, upon attachment, the gift credit amount is configured to be automatically applied to a purchase made against the payment account based on the purchase being associated with the gift card type.

A computer program product for virtual gift credit defines third embodiments of the invention. The computer program product includes a non-transitory computer-readable medium having computer-executable instructions. The instructions provide for receiving gift credit instructions that include a gift credit type, gift credit amount and an alias associated with a gift recipient. Additionally, the instructions provide for determining that the alias is registered with a payment account associated with the gift recipient. In addition the instructions provide for attaching the gift credit amount to the payment account based on determination that the alias is registered with the payment account. In additional embodiments of the computer program product the instructions provide for automatically applying the gift credit amount to a purchase made against the payment account based on the purchase being associated with the gift card type.

Thus, present embodiments of the invention, which are discussed in greater detail below, provide for systems, methods and computer program products for establishing virtual gift credit. The gift credit is automatically attached to a payment account or vehicle of the gift recipient upon issuance of the gift credit. As such, subsequent purchases made by the gift recipient using the payment account and of the designated gift credit type can be automatically settled using the gift credit amount. Additionally, through the use of aliases, which serve to tie an identifier, such as a gift recipient's telephone number, email address or the like, to a gift recipient's payment account/vehicle, embodiments of the invention simplify the process of electronic gift credit giving, in that the gift provider does not need to have knowledge of any information about the financial accounts of the intended gift recipient.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
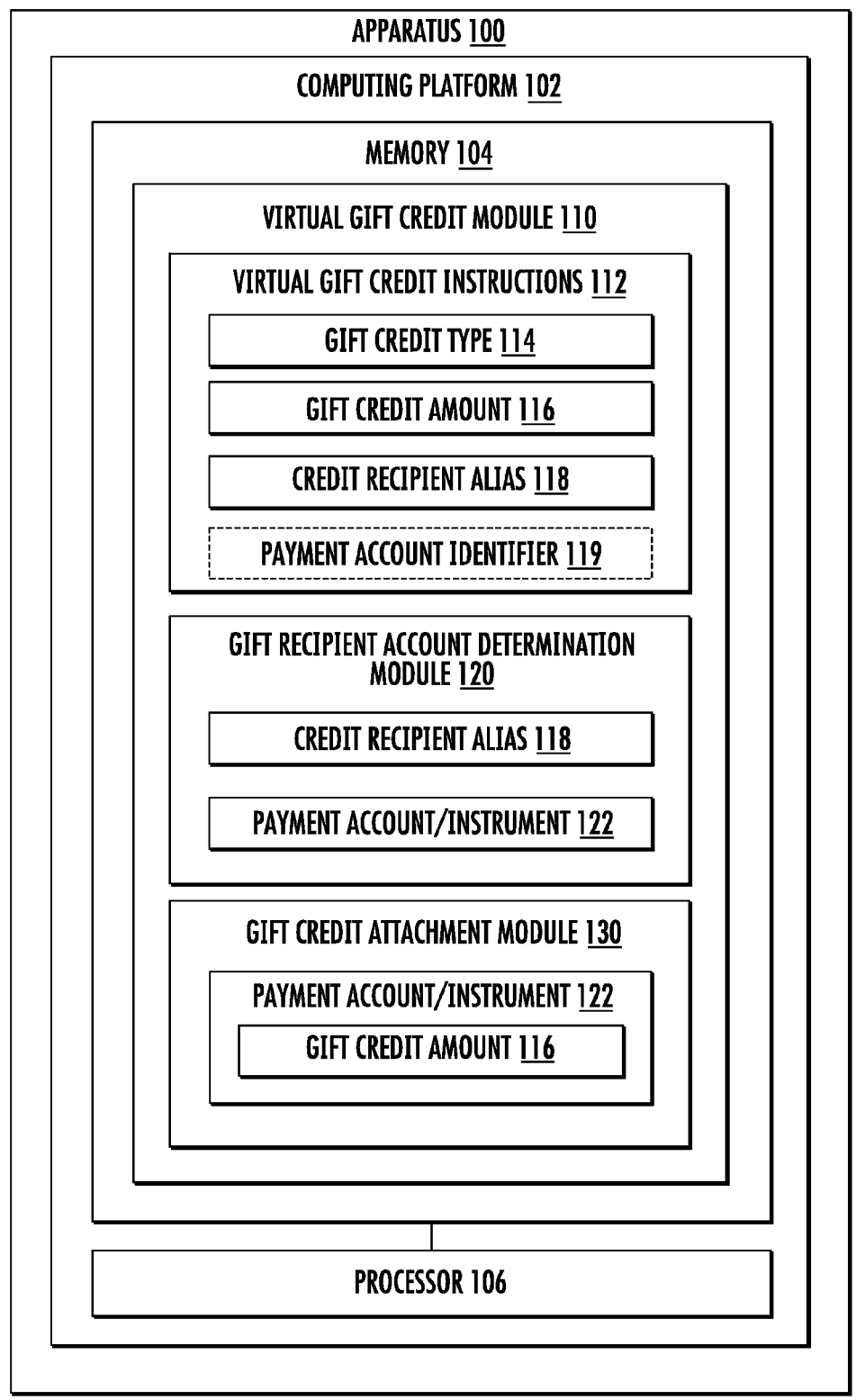
Figure 2:
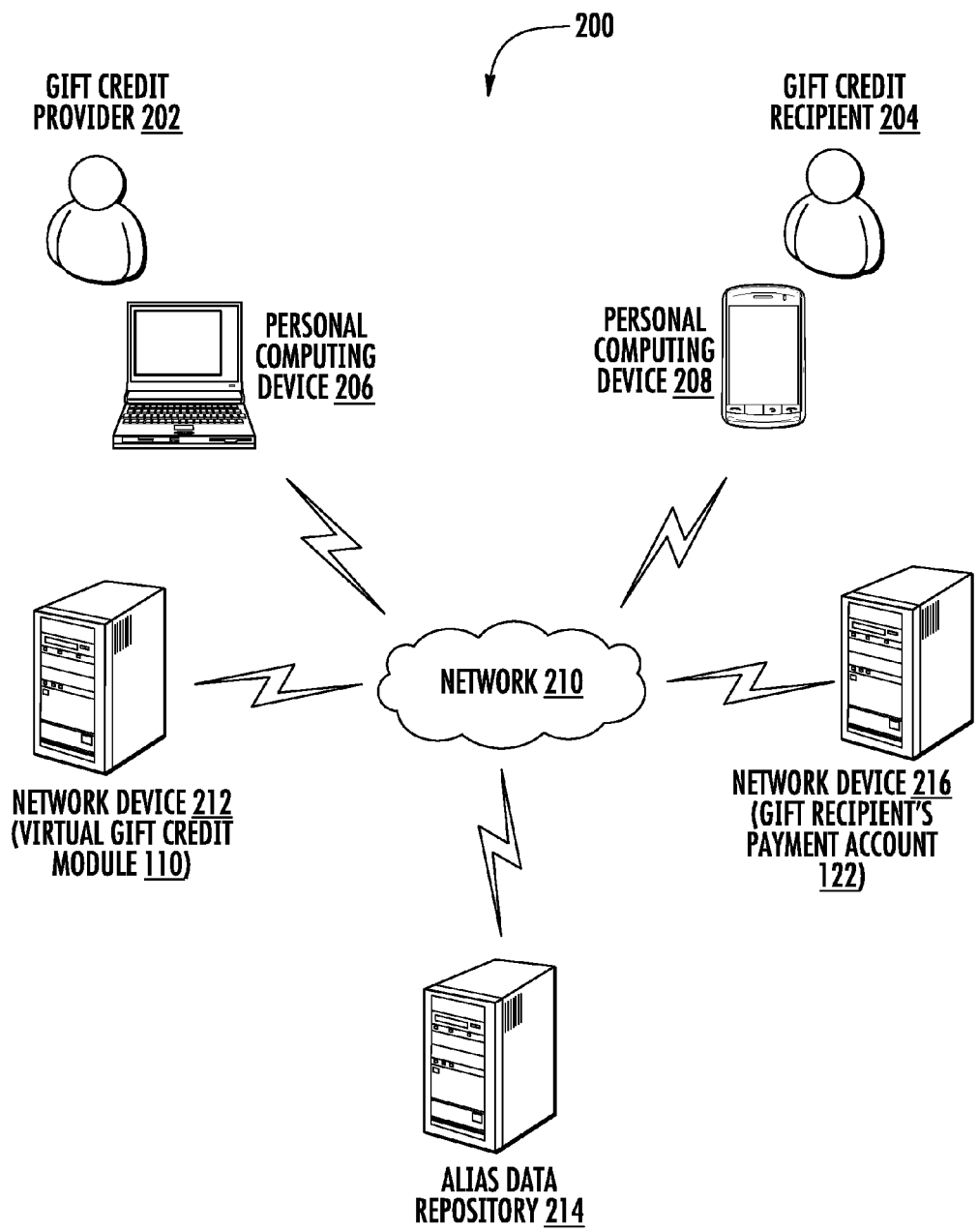
Figure 3:
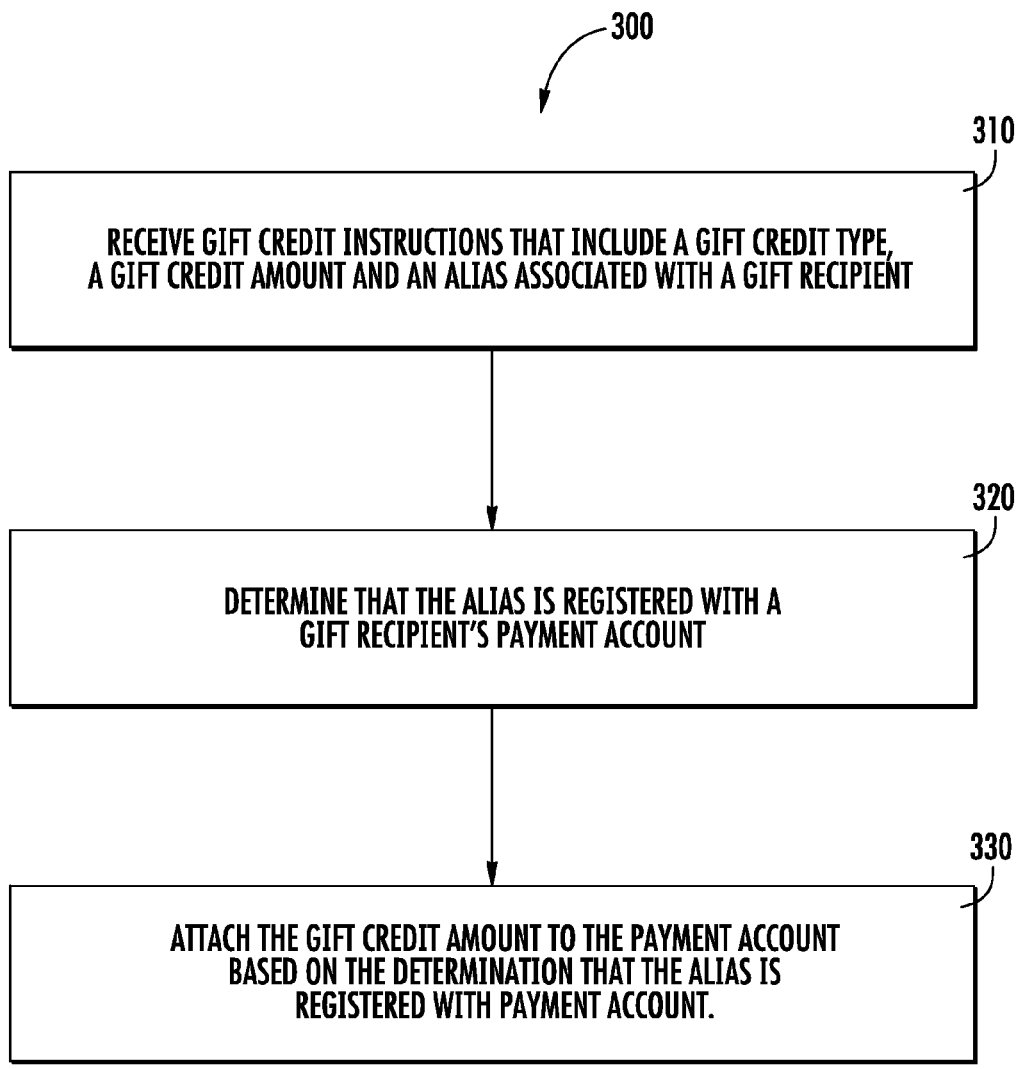
Figure 4:
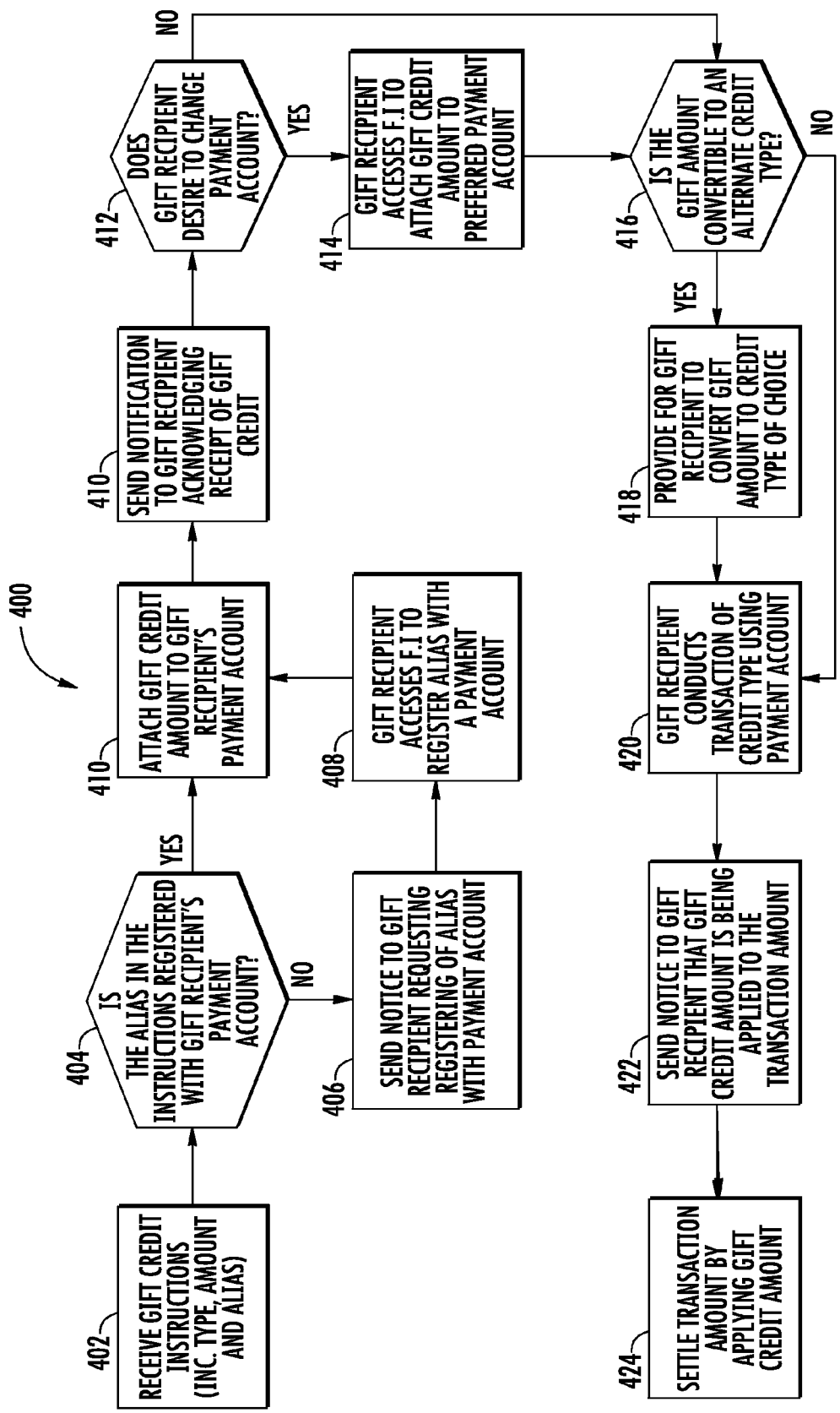
Figure 5:
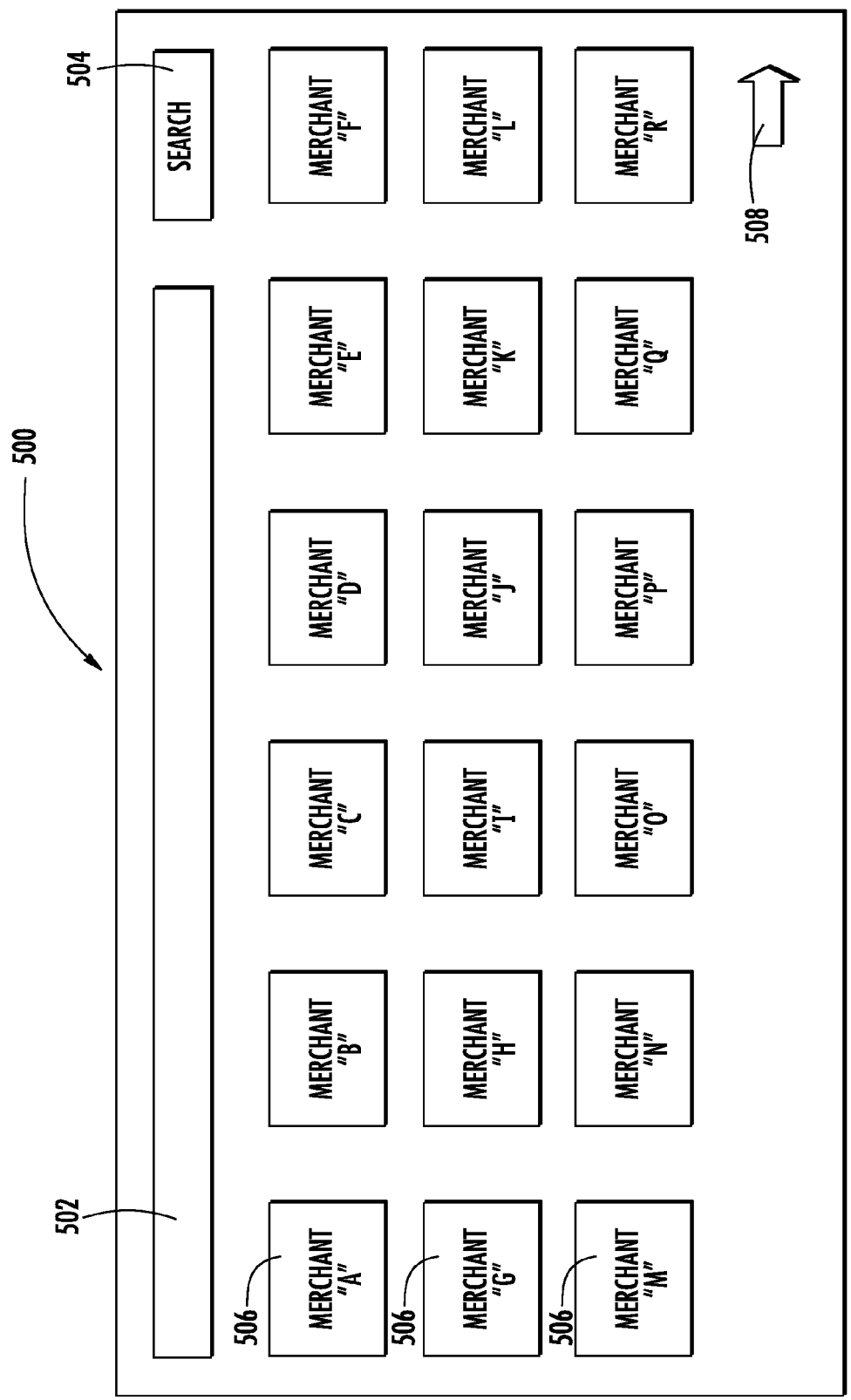
Figure 6:
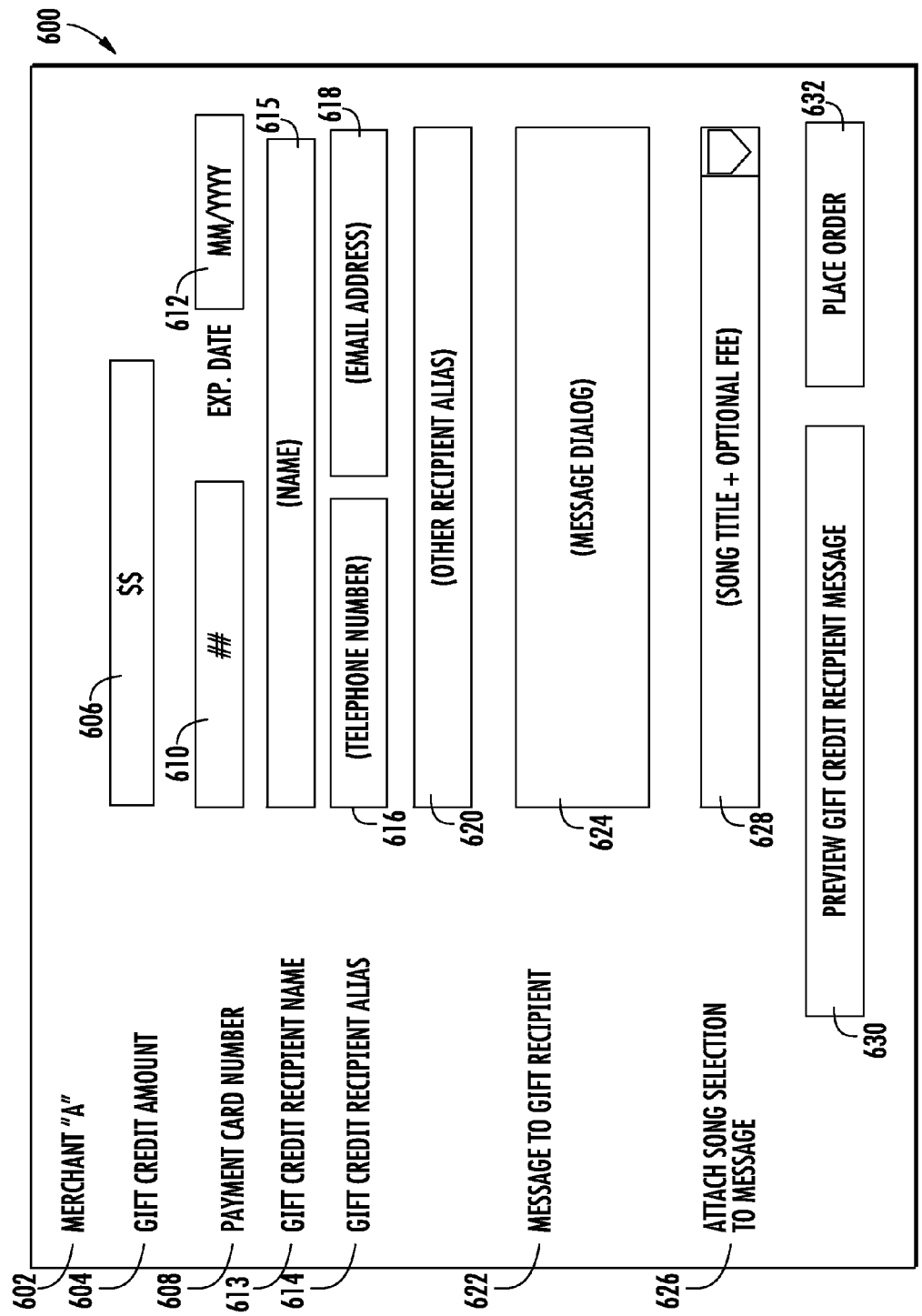
Figure 7:
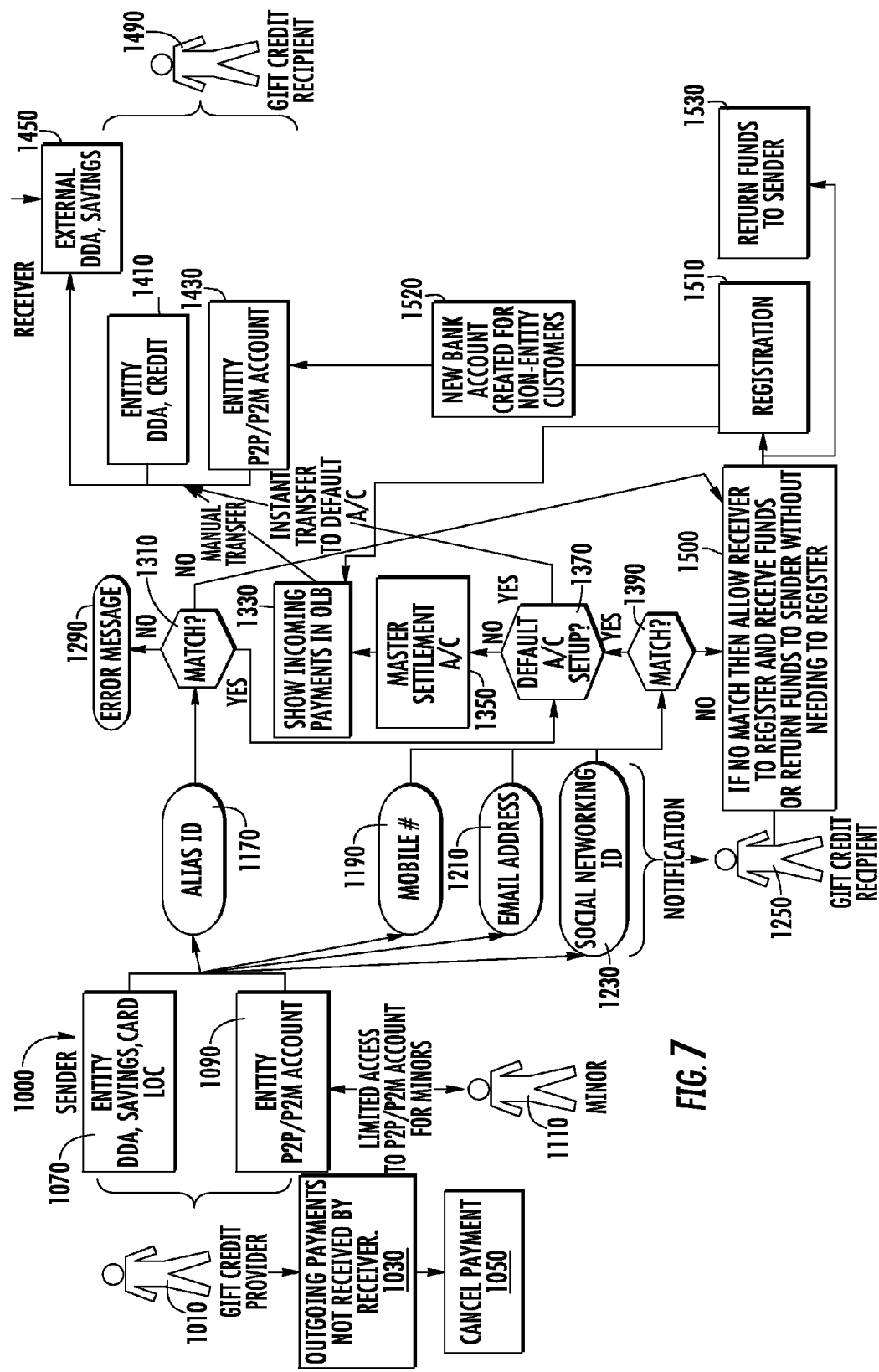
Figure 8:
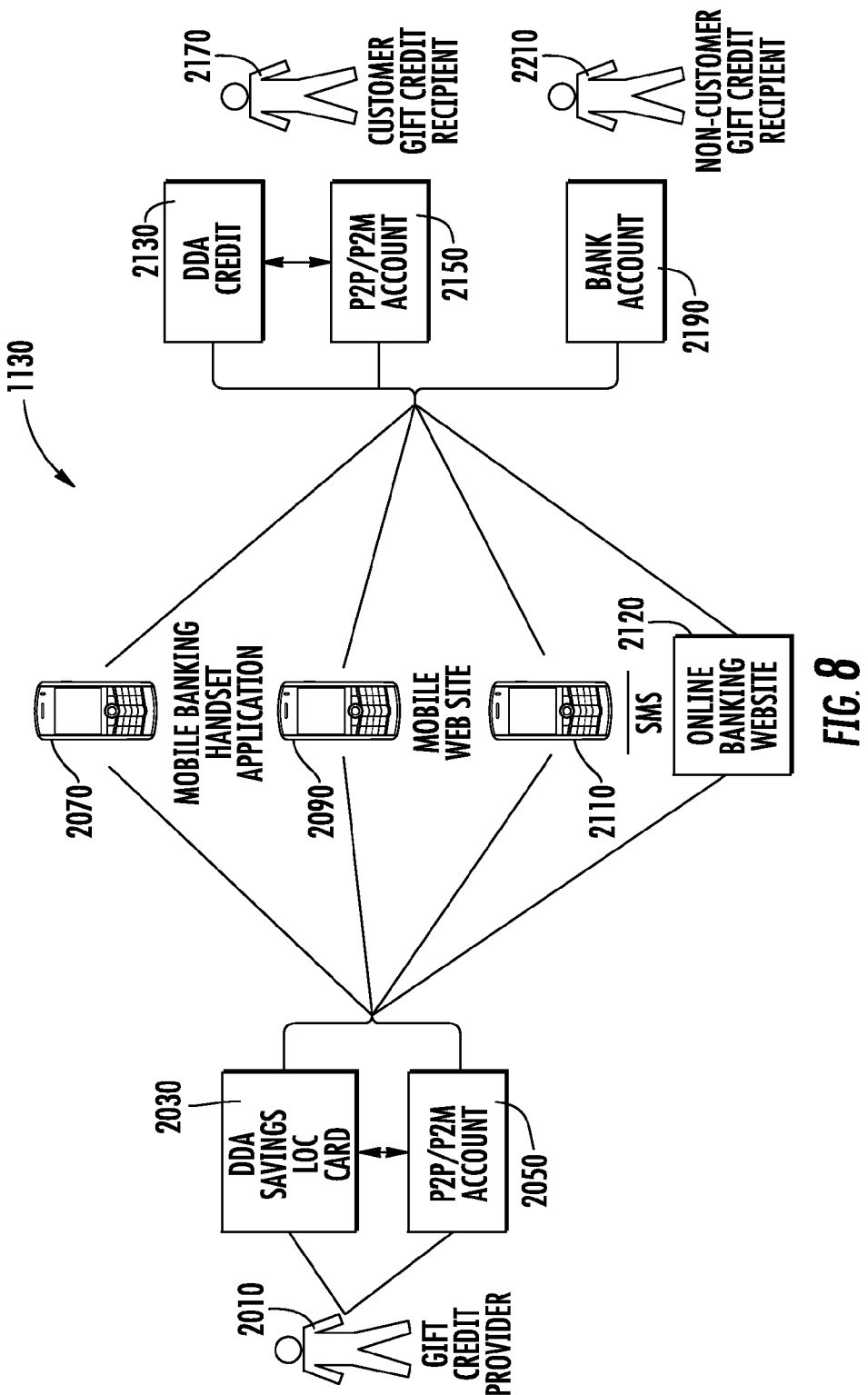

Having thus described embodiments of the invention in general terms, reference will now be made the accompanying drawings, wherein:

FIG. 1 is a block diagram of an apparatus configured to provide virtual gift credit, in accordance with embodiments of the present invention;

FIG. 2 is a schematic diagram of a system configured for providing virtual gift credit, in accordance with embodiments of the present invention;

FIG. 3 is a flow diagram of a method for providing virtual gift credit, in accordance with an embodiment of the present invention;

FIG. 4 is a flow diagram of a detailed method for providing and redeeming virtual gift credit, in accordance with embodiments of the present invention;

FIG. 5 is a block diagram of a virtual gift credit portal configured to provide gift providers options for searching and purchasing gift credit from different merchants, in accordance with embodiments of the present invention;

FIG. 6 is a block diagram of a virtual gift credit portal configured to provide for gift provider entry of gift credit instructions, in accordance with embodiments of the present invention;

FIG. 7 is a combination flowchart and block diagram of a system and method for making P2P payments in accordance with example embodiment of the invention; and FIG. 8 is a block diagram illustrating the various ways through which a customer may make P2P payments in accordance with various embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" or "financial entity" include any organization that processes financial transactions including, but not limited to, banks, credit unions, savings and loan associations, investment companies, stock brokerages, asset management firms, insurance companies and the like. In specific embodiments of the invention, use of the term "bank," is limited to a financial entity in which account-bearing customers conduct financial transactions, such as account deposits, withdrawals, transfers and the like.

Embodiments of the present invention describe an innovative virtual gift credit system that provides for gift credit to be automatically attached to a payment account or vehicle of the gift recipient upon issuance of the gift credit. By attaching the gift credit amount to the recipient's payment account/vehicle subsequent purchases made using the payment account/vehicle and of the type associated with the gift credit (e.g., purchases at the specified merchant associated with the gift credit) are automatically settled by applying the gift credit amount to the purchase amount. As such, the present system insures that the gift credit will be used by the gift recipient even if the gift recipient forgets that they are possession of the gift credit.

Additionally, the present invention does not necessarily require gift recipients to share confidential account information with gift providers in order for the gift providers to bestow gift credit upon the gift recipients. In fact, through the use of aliases, which serve to tie an identifier, such as a gift recipient's telephone number, email address or the like to a gift recipient's payment account/vehicle, embodiments of the invention do not require that the gift provider know any information about the financial accounts of the intended gift recipient.

Referring to FIG. 1 a block diagram is depicted of an apparatus 100 configured to virtual gift credit, in accordance with embodiments of the invention. The apparatus 100 includes a computing platform 102 having a memory 104 and at least one processor 106 in communication with the memory. The apparatus 100 may include any type and/or combination of one or more computing devices, such as servers, personal computers, or the like. The computing platform 102 is operable to receive and execute modules, routines and applications, such as virtual gift module 110, gift recipient determination module 120, gift credit attachment module 130 and the like. Memory 104 may comprise volatile and non-volatile memory such as read-only and/or random-access memory (RAM and ROM), EPROM, EEPROM, flash cards, or any memory common to computing platforms. Further, memory 104 may include one or more flash memory cells, or may be any secondary or tertiary storage device, such as magnetic media, optical media, tape, or soft or hard disk.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") layer (not shown in FIG. 1) that interfaces with any resident programs, such as virtual gift module 110, gift recipient determination module 120, gift credit attachment module 130 or the like, stored in the memory 108 of apparatus 102. Processor 106 may include various processing subsystems (not shown in FIG. 1) embodied in hardware, firmware, software, and combinations thereof, that enable the functionality of apparatus 100 and the operability of the apparatus on a network. For example, processing subsystems allow for initiating and maintaining communications, and exchanging data, with other networked devices. It should be noted that any of the modules, sub-modules, and routines shown and described as being stored in memory 104 may alternatively be embodied in processing subsystems.

The memory 104 of apparatus 100 stores virtual gift credit module 110 that is configured to receive virtual gift credit instructions 112 from a gift provider or someone acting on behalf of the gift provider. In specific embodiments, as discussed in detail below in relation to FIGS. 5 and 6 the virtual gift credit module provides for an Internet-based online virtual gift credit portal and/or a mobile application, in which gift credit providers/customers can access to purchase virtual gift credit. The virtual gift credit instructions 112 include, at a minimum, the gift credit type 114, the gift credit amount 116, and an alias 118 associated with a credit recipient alias. In most embodiments, the gift credit instructions 112 may also include a gift credit payment account identifier 119.

The gift credit type 114, which may be chosen by the gift provider/customer, defines the specificity of the use of the credit. For example, the module 110 may be configured to allow for gift credit types 114 that are specific to a designated merchant, such as a retailer, a restaurant, a restaurant chain or the like. In other embodiments, the module 110 may be configured to allow for gift credit types 114 defined by a type of designated merchants, such as all food sources, all restaurants or type of product or service, such as household items, spa services or the like. While in other embodiments of the invention, the module 110 may be configured to allow for generic gift credit, such as general credit applicable to any merchant that accepts conventional credit means. In specific embodiments the module 110 may be configured such that the gift credit provider may tailor the gift credit instructions 112 such that that gift credit type 114 is gift provider-specific. For example, the gift provider may designate that the credit only apply to specific types of products (e.g., food), specific merchants, or the like and/or exclude specific types of products (e.g., alcohol, tobacco), specific merchants or the like. In addition, the module 110 may provide for the gift credit provider to tailor gift credit instructions 112 such that the gift credit type 114 is limited to use in a specific geographic region, limited to use during a designated time of the day, week, month or year or the like.

The gift credit amount 116 is typically at the discretion of the gift provider/customer. However, in certain embodiments the module may be configured and/or the merchants may designate a minimum and/or maximum gift credit amount.

The gift credit payment account identifier 119 may be a credit card number or debit card number of the credit provider or the like. In instances in which the virtual gift credit is pre-paid or paid means other than a payment account, e.g., a cash payment, the need for receiving the payment account identifier 119 may be obviated.

The credit recipient alias 118 is instrumental to the present invention, in that it allows for the gift credit provider/customer to provide the alias in lieu of providing gift recipient financial account information (i.e., account number, routing number and the like.) In present embodiments of the invention, the alias is typically a telephone number, specifically a mobile telephone number or an email address of the credit recipient. Since, the telephone number or email address of the gift credit recipient is either readily remembered by the gift provider or easily accessible to the gift provider (e.g., stored on or accessible to the gift provider's mobile communication device). In addition, in the event that the gift recipient has not registered an alias or has not registered the alias provided by the gift provider, the telephone number and/or email address provide for a means of communicating with the gift recipient to notify the gift recipient of the need to register an alias. However, in other embodiments, the gift credit recipient may designate other aliases besides or in addition to telephone numbers and/or email addresses, such as but not limited to, birthdates, usernames, passcodes, or the like.

The memory 104 of apparatus 100 additionally includes gift recipient account determination module 120 configured to determine that the credit recipient alias 118 included in the gift credit instructions 110 is registered with a payment account/instrument 122 of the credit recipient. As such, the module 120 will communicate with an alias data repository to determine the payment account/instrument of the gift recipient to which the alias is registered. In the event that a determination is made that the credit recipient has not registered the alias with a corresponding payment account/instrument, a notification may be sent to the credit recipient asking them to access their financial institution (e.g., online access, mobile banking application or the like) for the purpose of receiving the gift credit (i.e., attaching the gift credit to a payment account/instrument and/or registering the alias to a payment account/instrument). The notification can be sent to the gift recipient by a system-configured or gift recipient-configured means, such as but not limited to, one or more of a text/SMS message, a voice mail, an email, social network site posting and/or the like. In the event, that the gift recipient ignores the notification or the gift recipient is otherwise unreachable (i.e., the alias provided by the gift provider does not identify a communication means) and, therefore, does not access their financial institution to attach the gift credit to a payment account, after a predetermined period of time, a notification may be sent to the gift provider/customer cancelling the gift credit and returning the payment amount to the gift provider, e.g., crediting the payment account used by gift provider when purchasing the gift credit.

Additionally, the memory 104 of apparatus 100 includes gift credit attachment module 130 which is configured to attach the gift credit amount 116 to the payment account/instrument 122 determined to be registered with the alias provided by the gift provider or as registered by the gift recipient upon notification of non-registration. The payment account/instrument 122 may be a credit account, a debit account, a prepaid credit account, a line of credit account, a mortgage account, a loan account, checking/DDA account or the like. Once the gift credit amount has been attached to the payment account, meaning a credit in the amount of the gift credit is applied to the payment account, the gift recipient may be notified, typically through text/SMS, email or the like, that they have received a gift credit from the gift provider. The notification may include the gift credit type, the gift credit amount, the payment account/instrument to which the credit is attached and, optionally, a personalized message from the gift provider. In specific embodiments of the invention, as discussed in detail in relation to FIG. 4, the apparatus/system may be further configured to allow the gift recipient to change the payment account/instrument to which the gift amount is attached and/or convert the credit type (e.g., convert the use of the credit from the designated merchant to a merchant of choice, convert the use of the credit from the designated merchant to general use credit or convert the credit to cash, etc.).

As previously noted, once the gift credit has been attached to the payment account, any subsequent purchase of the designated credit type will apply the gift credit toward the settlement of that purchase. In this regard, the gift recipient does not need to take an overt action to apply the credit to the purchase nor does the gift recipient need to be aware that the gift credit exists on the payment account. For example, if the gift recipient makes a $100.00 purchase at the merchant designated for the gift credit and has an attached $50.00 gift credit, the purchase transaction will be for the $100.00 amount and the settlement of the transaction will apply the $50.00 gift credit to the transaction amount (i.e., the gift recipient will only owe the remaining $50.00 to complete settlement of the transaction). As a means of notifying the gift recipient that the gift credit is being applied, a notification stating such may be sent to the gift recipient in close proximity to the completion of the transaction, typically via text/SMS, email or the like.

FIG. 2 provides a block diagram illustrating the architecture and environment of a virtual gift credit system 200, in accordance with an embodiment of the invention. As illustrated in FIG. 2, the virtual gift card system 200 includes a gift credit provider 202 and a gift credit recipient 204, in which the gift credit provider 202 desires to send virtual gift credit to the gift credit recipient 204. The gift credit provider 202 and/or the gift credit recipient may be an individual person, a group of persons, a business entity (e.g., a merchant) or any other entity capable of sending or receiving gift credit.

The virtual gift credit system 200 also includes personal computing devices 206 and 208, which are respectively associated with gift credit provider 202 and gift credit recipient 204. Each personal computing device 202 and 208 may be any device that employs a processor and memory, is configured to perform computing functions, and can communicate upstream and downstream via wireless and/or wired communication with communication network 210. As such, personal computing devices 202 and 208 may be personal computers (PCs), portable/laptop computers, mobile communication devices (e.g., smart phones, personal digital assistant (PDA), a mobile Internet-accessing device or the like) or the like. The communication network 210 may include a local area network (LAN), a wide area network (WAN), and/or a global area network (GAN). The network 210 may provide for wireline, wireless, or a combination of wireline and wireless communication between devices in the network. In one embodiment, the network 210 includes the Internet.

Personal computing device 208 is configured to communicate with network device 212, which may be a server or the like and is configured to provide access to virtual gift credit module 110. For example, in those embodiments in which the virtual gift credit module is an Internet-accessible gift credit portal, the gift credit provider 202 can access the portal via their corresponding personal computing device 206. In alternate embodiments, the virtual gift credit module 110 may be a downloadable application executable on the gift credit provider's personal computing device 206, such as a smart phone or the like. In other alternate embodiments, in which the virtual gift credit module is accessible via an online banking site or some other entities web site, the gift credit provider 202 may be required to log-on to the website prior to accessing the virtual gift credit module 110. The virtual gift credit module 110 is configured to allow the gift credit provider 202 to enter gift credit instructions to initiate the gift crediting process. As previously noted, the gift credit instructions include, at a minimum, the gift credit type 114, the gift credit amount 116, and the alias 118 associated with the gift credit recipient 204 and in some embodiments, payment account identifier 119.

Once the gift credit provider 202 has properly submitted the required gift credit instructions, the alias 118 is communicated, via network 210, to alias data repository 214 to verify/determine that the alias is associated with a payment account/instrument 122 of the intended gift credit recipient. In some embodiments of the invention, the alias data repository 214 is configured to be controlled and managed by one or more third-party data providers (not shown in FIG. 2) over the network 210. In other embodiments, the alias data repository 214 is configured to be controlled and managed over the network 210 by the same entity that maintains the virtual gift credit system 200, such as a financial institution or the like. In still other embodiments, the alias data repository 214 may be configured as a component of an online banking system.

If the alias 118 is not verified as being associated with a payment account/instrument 122 of the intended gift credit recipient 204, a communication is sent to the gift credit recipient 204 via the network 210 or some other network, such as a cellular network or the like, requesting that the gift credit recipient register the alias 118 with a payment account/instrument at their respective financial institution, if their respective financial institution participates in the payment/alias program, or, if their respective financial institution does not participate in the payment/alias program, opening an account and registering the alias with a participating financial institution.

If the alias 118 is registered with a payment account/instrument 122 or once the gift credit recipient 204 registers the alias with a payment account/instrument 122, the virtual gift credit module 110 communicates with network device 216 to attach the gift credit amount to the payment account 122 of the gift credit recipient 204. In this regard, network device 216 may be a financial institution server or the like in the control of the gift credit provider's financial institution. In specific embodiments, once the gift credit amount is attached, a notification is communicated to the gift credit recipient 204, via personal computing device 208, notifying the recipient of the gift credit attachment and, optional, any personalized note provided by the gift credit provider 206.

Referring to FIG. 3 a flow diagram is provided of a method 300 for providing virtual gift credit, in accordance with embodiments of the present invention. At Event 310, gift credit instructions are received that include, at a minimum, a gift credit type, a gift credit amount, and an alias associated with the gift credit recipient. In accordance with specific embodiments the gift credit instructions may be received through implementation of a gift credit web portal or the like, an example of which is shown and described in relation to FIGS. 5 and 6.

At Event 320, once the gift credit instructions have been received, a determination is made that the alias is registered with a payment account/instrument of the intended gift card recipient. Determination is accomplished by communicating the alias to an alias data repository or the like to verify that a match exists between the alias and a payment account. If the alias is not currently registered with the gift credit recipient, a notification may be sent to the intended gift credit recipient requesting that they register the alias with a payment account or otherwise provide for associating the gift credit with a payment account.

Once the alias is determined to be registered with a payment account/instrument of the intended gift credit recipient, at Event 330 the gift credit amount is attached to the payment account associated/registered with the alias. Once the gift credit amount is attached to the payment account, a notification is communicated to the gift credit recipient notifying them of the gift credit and that the gift credit is ready to be redeemed for a purchase associated with the designated gift credit type (i.e., a purchase at the merchant designated by the gift provider or the like).

Referring to FIG. 4 a flow diagram is presented of a more detailed method 400 for providing virtual gift credit, in accordance with embodiments of the present invention. The detailed method 400 of FIG. 4 provides for various alternate/ optional embodiments of the present invention. At Event 402 gift credit instructions are received that include, at a minimum, a gift credit type, a gift credit amount, and an alias associated with the gift credit recipient. In addition, the received gift credit instructions may include a payment account identifier, the name of the intended gift credit recipient, a personalized message stating the reason for the gift credit and the like.

At Decision 404, a determination is made as to whether the alias received in the gift credit instructions is registered with a payment account of the intended recipient. If a determination is made that the alias is not currently registered with a payment account/instrument of the intended gift credit recipient, at Event 406, a notification is sent to the gift credit recipient requesting registration of the alias with a payment account/instrument of the gift credit recipient. At Event 408, the gift credit recipient accesses a financial institution, such as an online banking service or mobile banking application, to register the alias with a payment account. If the gift credit recipient's current financial institution does not participate in a peer-t-peer payment system, the gift credit recipient may be required to open an account and register the alias at a financial institution different from their current financial institution. While not shown in the method 400 of FIG. 4 it should be noted that if the intended gift credit recipient does not receive a notification requesting registration of the alias or receives the notification and either ignores the notification or chooses not to register the alias, upon lapse of a predetermined time period, the gift credit will be terminated and a notification sent to the gift credit provider that the gift credit amount is being credited back to the gift credit provider's payment account or otherwise refunded to the gift credit provider.

If a determination is made that the alias is registered with a payment account/instrument of the intended gift credit recipient (Event 404) or once the gift credit recipient access the financial institution and properly registers the alias with a payment account (Event 408), at Event 410, the gift credit amount is attached to the payment amount/instrument designated by the gift credit recipient. Once the gift credit amount has been attached to the gift credit recipient's payment account, at Event 410 a notification is sent to the gift recipient acknowledging receipt of the gift credit and including any personalized message from the gift credit provider.

At Decision 412, if the gift credit system is configured for such, a determination is made as to whether the gift credit recipient desires to change the payment account to which the gift credit is attached. For example, the gift credit recipient may have preconfigured the system for attachment to a credit card account and currently desires to attach the gift credit to a debit card-associated account. It should be noted that the decision to change the attached payment account may occur at any time in which the gift credit is outstanding, for example, shortly after receiving the gift credit or right before redemption of the gift credit. If the determination is made that the gift credit recipient desires to change the payment account, at Event 414, the gift credit recipient access the financial institution, such as via an online or mobile banking application, and attaches the gift credit amount to their preferred payment account/instrument.

At Decision 416, if the gift credit system is configured for such, a determination is made as to whether the gift credit recipient desires to convert the gift credit type to an alternate gift credit type. For example, the gift credit is designated by the gift credit provider for a specific restaurant and the gift credit recipient desires to change the credit to another restaurant, merchant or, in some embodiments to general credit. In other embodiments of the invention, the system may allow for the gift credit recipient to convert the gift credit to a cash payout. In specific embodiments, the system may allow for conversion of the gift credit type to another gift credit type or cash upon agreement to pay a fee associated with the conversion. In other specific embodiments in which the system provides for conversion, the gift credit provider may configure the gift credit such that the gift credit type is not subject to conversion or otherwise limited to type of conversion (i.e., the gift credit recipient must redeem the credit for the gift credit type designated by the gift credit provider or the gift credit recipient is limited to converting the gift credit to restaurant gift credit only). It should be noted that the decision to convert the gift credit type may occur at any time in which the gift credit is outstanding, for example, shortly after receiving the gift credit or right before redemption of the gift credit. As such, while Decision 416 is shown as occurring after the decision to change payment accounts it may in fact occur prior to or simultaneously with the decision to change payment accounts. If the gift credit recipient does desire to convert the gift credit amount, at Event 419, the gift credit recipient accesses the financial institution, such as via online or mobile banking applications, and converts the gift credit amount to their gift credit type of choice or to cash.

At Event 420, the gift credit recipient conducts a transaction of the type associated with the gift credit type and using the payment account to which the gift credit is attached. It should be noted that according to specific embodiments, the gift credit amount may be deducted from the transaction at the point of sale or, in most instances; the gift credit amount will subsequently be applied to settlement of the transaction. At Event 422, a notification, such as an a text/SMS, email or the like, is sent to the gift credit recipient shortly after the completion of the transaction that acknowledges that the outstanding gift credit amount is being applied to the transaction amount. At Event 424, the transaction is settled by applying the outstanding gift credit amount to the transaction amount.

Referring to FIG. 5 a block diagram is shown that depicts an example of a gift credit portal 500 for choosing various gift credit types, in accordance with an embodiment of the present invention. The portal, which may be accessible via the Internet or some other communication network, displays multiple tiles 506 which represent the gift credit types (e.g., specific retailers, specific restaurants, restaurant chains, etc.) that may be purchased for virtual gift crediting. The gift credit provider may page through multiple pages of tiles 506 by activating the arrow key 508 or performing some other use input activity (e.g., scroll bar engagement) to page or scroll through the tiles 506. The tiles may be arranged in any order desired by the system provider and/or virtual gift card provider. For example, the tiles may be presented in alphabetical order, in order of most purchased gift credit type or the like. In one embodiment, not shown in FIG. 5, keys or another input mechanism may be provided for the gift credit provider to choose the order of the tiles 506 from amongst various ordering selections. In another embodiment of the invention, the system provider may charge the gift creditors, i.e., retailers or the like a fee based on their desired order of presentation. For example, first page presentation is charged a specified fee, first line presentation on the first page is charged a slightly higher fee and the like.

The portal 500 additional is configured to include a search entry input 502 for entry of search criteria that defines the name or some other identifying feature of the gift creditor. For example, the gift credit provider may enter a specific restaurant name and, upon activating the search button 504, if the specific restaurant is provided for in the gift credit system, either the tile representing the restaurant is displayed or the gift credit instruction entry page corresponding to that specific restaurant is displayed. In other example, the gift credit provider may enter a term that defines a category of gift card type, for example "restaurants" and, upon activation of the search button 504, the system will return all of the restaurants in the system. In yet another example, the gift credit provider may provide a physical address/region (e.g., city, state or country) or postal/zip code and, upon activation of the search button the system will return all of the gift credit types located in or proximate to the address/region or zip code.

The gift credit provider may select a gift creditor by activating the corresponding tile 506 on portal 500 to display the gift credit instruction/order entry page 600 shown in FIG. 6. In alternate embodiments of the invention, the gift credit instruction/order entry page 600 for a specific merchant/retailer may be accessible via a link provided on the corresponding merchant/retailer's web site, a quick response (QR) code in an advertisement for the merchant/retailer or the like. The gift credit instruction/order entry page 600 includes an identifier 602 for the chosen gift credit type, i.e., the name of the merchant/retailer or the like. In addition, the gift credit instruction/order entry page 600 includes gift credit amount identifier 604 and corresponding gift credit amount entry fields 606 configured for the gift credit provider to input the desired gift credit amount. As previously noted, the system may provide for minimum or maximum amounts for gift credits. Additionally, the amount may be entered in the gift provider's currency of choice and, if the gift credit type (i.e., retailer, merchant) is located in another country or the intended gift recipient is residing/located in another country the gift credit notification to the recipient may reflect the other country's currency. In addition, the gift card amount may be configured to be exchanged to the currency of the recipient or the currency accepted by the gift credit retailer at the time the gift credit is purchased or at the time of the credit-applying transaction.

The also gift credit instruction/order entry page 600 also includes gift provider payment information identifier 608 and corresponding entry fields 610 and 612, configured for the gift credit provider to input their payment information, which in the illustrated embodiments include credit/debit card number entry field 610 and expiration date entry field 612.

The gift credit instruction/order entry page 600 additionally includes gift credit recipient name identifier 613 and corresponding gift credit recipient name entry field 615 configured for the gift credit provider to enter in the name of the gift credit recipient. The name of the gift credit recipient may be necessary to verify that the alias provided by the gift credit provider matches an alias that is, in fact, associated with the named gift credit recipient. Additionally, gift credit instruction/order entry page 600 additionally includes gift credit recipient alias identifier 614 and corresponding entry fields 616, 618 and 620 configured for the gift credit provider to enter one or more alias associated with the intended gift credit recipient. In the illustrated embodiment of the FIG. 6, the alias entry fields include telephone number entry field 616, email address entry field 618 and other recipient alias entry field 620 for entry of any other alias that the gift credit recipient may have registered in the system. Entry of multiple known aliases may insure that one of the aliases entered is an alias registered by the gift credit recipient.

Optionally, the gift credit instruction/order entry page 600 may include a "message to gift recipient" identifier 622 and corresponding dialog entry field 624 configured to allow the gift credit provider to personalize a message to the gift credit recipient that will either be included in the message notifying the recipient that the gift credit has been attached to their payment account or notifying the recipient that the alias requires registration. Additionally, the gift credit instruction/order entry page 600 may include an "attach song selection to message" identifier 626 and a corresponding drop down menu 628 configured to provide the gift credit provider the option of attaching an audio/song file to the personalized message; such that the personalized message and attached audio/song file acts as multimedia greeting card. In specific embodiments of the invention, the gift credit system provider may charge the gift credit provider a nominal fee for inclusion of the song/audio in the notification.

Moreover, the gift credit instruction/order entry page 600 may include a "preview gift credit recipient message" button 630, which upon activation presents the personalized message along with the selected song/audio file, if so chosen. In addition, the gift credit instruction/order entry page 600 includes a place order button 632, which upon activation by the gift card provider places the order for the gift card and begins the process of verifying the alias and attaching the gift credit to the payment account registered with the alias.

It should be noted that in alternate embodiments of the invention, the virtual gift credit system may be configured such that the gift credit provider is not limited to selecting a gift creditor (i.e., merchant, retailer, etc.) that is affiliated with the gift card program. In such embodiments, the gift card provider can choose any gift creditor (i.e., merchant, retailer, etc.) as long as the gift creditor accepts the payment account/instrument to which the gift credit applies.

In additional embodiments, the concept of virtual gift crediting may be expanded to include providing for budgeted credit, in which the user of credit may predefine specific category or merchant spending limits for a predetermined time period and, if the spending limits are exceeded the customer is either electronically notified of exceeding the spend threshold or denied from proceeding with the transaction. For example, a credit user may desire to limit their expenditures at a specific coffee shop to a specified amount per month and if the user exceeds the specified amount during a month (i.e., the user charges in excess of the specified amount), the user is notified of exceeding the threshold, via text message or the like, or the transaction may be denied and/or subsequent coffee shop transactions during that particular month are denied. Such budgeting of credit use may be highly applicable in the instance in which parents/guardians provide their children/minors with gift credit. The parents may configure the gift credit such that the child/minor is restricted from using the credit for designated purchase types (e.g. alcohol, tobacco) or designated merchants, retailers or is limited by a spend amount over a designated time period for designated purchase types and/or designated merchants.

In yet another expanded concept, alias-based government disbursements may be provided for, in which citizens register an alias with a government-controlled financial institution account and the alias is provided to the government for subsequent government disbursements. Such alias-based government disbursements allows for the government to insure that all disbursements paid/credited to an individual or family, such as childcare benefits, welfare benefits, tax refunds, social security benefits or the like are credited to a single financial institution account. In addition, the government or other entity may have control over the designated account to which the funds, benefits are distributed, such as maximum withdrawal limits, spend limits based on product and/or merchant as well as the ability to track the individual or families spending from the designated account.

FIG. 7 is a combination block diagram and flowchart providing an overview of a general system and method 1000 for making peer-to-peer (P2P) payments, in accordance with one or more embodiments of the invention. A customer (i.e., gift recipient) 1010 with an eligible payment account 1070, e.g., a debit card (demand deposit account or "DDA"), line of credit, credit card, etc., of a financial entity is able to register and make use of this service. During the registration process, the customer 1010 is able to set up an alias identifier (ID) 1170 (or simply an "alias") that maps back to the customer's account. The alias 1170 may be any unique identifier other than the customer's financial institution account number. Typically, the alias 1170 is an identifier that friends, family, and/or other members of the public uniquely associate with the customer 1010. For example, the alias 1170 may be a mobile telephone number 1190, an email address 1210, a social networking ID 1230, and/or the like. The embodiments of the invention described herein in the other figures generally permit the customer 1010 to use either a mobile telephone number 1190 or an email address 1210 as the account alias, but it will be appreciated that, in view of this disclosure, other embodiments of the invention may allow use of other types of aliases.

The information provided by the customer 1010 during registration of an alias may be verified to confirm that the customer 1010 does have access to the mobile number 1190, email address 1210, social networking ID 1230, or other alias 1170 provided. For example, as described in greater detail below, the financial institution (or other entity that maintains a database of aliases and associates them with financial institution accounts) may send a communication to the customer 1010 using the alias and require the customer 1010 to confirm access to the alias by responding to the notice in some way. For example, if the alias registered by the customer 1010 is a mobile telephone number 1190, the financial institution may send a text message to the mobile telephone number 1190 with a code and then require that the customer 1010 enter the code into a mobile banking or online banking application to confirm that the mobile telephone number is associated with the customer 1010. Once the alias information is verified, then the alias is linked to one or more of the customer's financial institution accounts in a data repository maintained by the financial institution or some other entity that provides an alias registry service to the financial institution.

The customer 1010 can also use embodiments of the invention to provide gift credit to other entity's, such as receiver 1250, using an alias of the receiver 1250. In some embodiments of the invention, the customer 1010 is able to set preferences for accounts to be used for gift purchasing gift credit, and default account(s) for attaching gift credit. In some embodiments of the invention, the financial institution places limits (e.g., maximums and/or minimums) on how much money and/or gift credits can be sent or received over a specified period of time using P2P payment aliases, and such limits may be based on the sender/gift provider, the receiver/gift recipient, whether the receiver/gift recipient is a customer of the financial institution or a partner financial institution, account history, credit ratings, customer status, whether the customer has registered the alias, and/or any other relevant information. In some embodiments, the customer 1010 can also establish limits on purchasing and/or receiving P2P gift credits. For example, a customer 1010 may want to set a maximum of $1000 for P2P gift credit purchases where an alias is used for the recipient as opposed to an account number.

In some embodiments of the invention, the customer 1010 may also have an option of opening a new P2P (e.g., gift credit) account 1090 with the financial institution that the customer may use exclusively for making and/or receiving P2P payments, such as purchasing gift credits and/or receiving/attaching gift credits. This financial entity P2P account 1090 may be like any other account hosted at the financial entity and, as such. money may be moved instantly into this account 1090 through the regular online banking transfer process for moving money between a customer's accounts. P2P/gift credit account 1090 may be a type of DDA (demand deposit account) or credit account, however, that it may come with certain limitations, e.g., no checks, maximum balance limits, maximum number of daily transactions or the like, and may be opened by customers providing much less information as compared to a regular DDA account. The financial entity may, at a minimum, require customers to provide certain information, such as name, address, date of birth, and social security number, in order to comply with Anti-Money Laundering (AML) regulations. Customers 1010 of the financial entity may also have an option to set up P2P accounts 1090 (i.e., sub-accounts) for minors 1110, other dependents, or related entities. Customers 1010 are able to access these accounts just like any of their other accounts. In addition, customers 1010 are able to set up an online banking access ID for the minor 1110 that the minor 1110 may use to sign into online banking but have access only to the specific minor P2P account 1090 set up for them.

In accordance with embodiments of the invention, gift credit purchases may be made by providing an alias 1170. In general, as described in greater detail below, the customer 1010 initiates a P2P gift credit purchase by using an alias and communicating the alias 1170 and an associated payment amount to the financial institution. The financial institution then accesses an alias database, or other type of data repository, to determine if the entered alias 1170 has been registered by the alias holder/gift recipient and is, thereby, associated with a particular financial institution account. If the alias 1170 does have a match to a payment account of the gift credit recipient, then the attachment of the gift credit may be initiated to the gift recipient, as described in greater detail below. If there is no match, then either an error message 1290 is generated or, if possible, the alias 1170 may be used to contact the intended gift credit recipient 1250 and allow this person to register the alias 1170 and thereby associate the alias with a financial institution account. At any time, if gift credit is not attached to the recipient's payment account and/or gift credit notifications are not received (as represented by block 1030), the gift credit may be canceled (as represented by block 1050).

In some embodiments of the invention, an alias 1170 may be associated with multiple financial institution accounts of the alias holder. In some such embodiments, the alias holder may be able to establish a default account for gift credits when registering the alias 1170 or afterwards. Consequently, if a gift credit recipient 1250 does have a default account for incoming gift credits in 1370, then the funds may be attached instantly to that account(s). If the gift recipient 1250 has not set up a default account in 1370 but the gift credit recipient 1250 does have multiple accounts associated with the alias 117, then the funds may be moved to a master payment/settlement account 1350 and the gift credit recipient 1250 may see the payment as an incoming payment within online banking 1330, mobile banking or the like. The gift credit recipient 1250 may then be able to use the online banking application to attach the credit amount instantly to any of the receiver's others accounts. In other embodiments, however, each alias 1170 is associated only with one financial institution account and, therefore, steps 1370 and 1350 are not needed and the payment is deposited directly into the one financial institution account associated with the alias 1170. In such instances, the gift credit recipient 1250 may be able to change the attached account after the gift credit has been attached to the preconfigured financial institution associated with the alias 1170.

As further illustrated in FIG. 7, the alias 1170 may be a mobile telephone number 1190 and, as such, a gift credit purchase may be made by the customer 1010 providing a mobile phone number 1190 of the intended gift credit recipient 1250 along with an associated payment amount. If, at Decision 1390, there is no match, then a text message voice mail message or the like may be sent to the mobile number 1190 provided (as represented by block 1500). If the intended gift credit recipient 1250 is an existing financial institution customer (or, in some embodiments, if the gift credit recipient 1250 is a customer of a partner financial institution also participating in the P2P gift credit program), then that intended gift credit recipient may be allowed to sign into their online or mobile banking account, register the phone number as illustrated by block 1510 (thereby associating the phone number with a financial institution account for P2P gift credit receipt purposes), and then receive the gift credit similar to the process described above for the alias 1170. If the gift credit recipient 1250 is not a financial entity customer with an account eligible for receiving gift credits, then the gift credit recipient 1250 may be given the option to sign up (as represented by block 1520) for a financial institution account 1410 or 1430 at the financial institution or provide for the return of the gift credit to the gift credit provider (as represented by block 1530).

As further illustrated in FIG. 7, the alias 1170 may be an email address 1210 and, as such, gift credit purchase may be made by the gift credit provider 1010 providing an email address 1210 of the intended gift credit recipient 1250 along with an associated gift credit amount. This operation may perform exactly as described above for a mobile number 1190 except that the notification message (with the registration or account opening option if appropriate) is sent to the email address 1210 provided.

In some embodiments of the invention, virtual gift crediting may be made by providing a social networking ID 1230, such as a unique ID associated with the intended gift credit recipient 1250 on a particular social networking Internet site. In such a situation, the process operates in the same way as described above for mobile phone number 1190 and email address 1210 except the social networking platform may be used to notify the receiver based on the social networking ID 1230 provided.

In all cases described above, if the intended gift credit recipient 1250 is already a customer of the financial institution or a partner financial institution and has already registered the alias 1170 provided by the gift provider 1010, a text message, email, online banking notice, mobile banking notice, social network posting or other type of message may be sent to gift credit recipient 1250 based on the alias 1170 entered by the gift credit provider 1010 or irrespective of information entered by gift credit provider if there is other contact information found in the gift credit recipient's profile, the notification notifying the gift credit recipient 1250 of the gift credit. In some embodiments, the gift credit recipient 1250 may be allowed to decline the gift credit or re-route the gift credit to another recipient. In some embodiments of the invention, the gift credit provider 1010 is permitted to include a personalized note to the gift credit recipient 125 along with the gift credit notice, such as a personalized note explaining to the recipient the reason or intent for the gift credit.

FIG. 8 is a block diagram illustrating the various ways through which a customer may make P2P gift credit purchases in accordance with various embodiments of the invention. As illustrated, in some embodiments of the invention, a customer/gift credit provider 2010 who may in some embodiments be signed up for the P2P payment service has the option to initiate P2P gift credit purchases from a DDA, savings, line of credit, and/or credit card account 2030 of the financial entity (and/or from a P2P-specific account 2050 held with the financial entity) through the financial entity's mobile banking website 2090 or a mobile banking handset application 2070 by providing any of the above-described alias information, e.g., phone number, email address, social networking ID, and/or other alias, along with a gift credit amount and gift credit type. In some embodiments of the invention, customers can alternatively or additionally initiate gift credit purchase by sending a text message 2110 to the financial entity, the text message including the gift credit recipient's phone number, email address, social networking ID, nickname, or other alias, the gift credit amount, the gift credit type and, in some instances the gift credit payment account. In some embodiments, customers can alternatively or additionally use the financial institution's online banking website 212 to initiate purchase of a gift credit using an alias. Whether via a mobile banking handset application 2070, mobile website 2090, short message service 2110, or online banking website or standalone website 2120, a gift credit recipient 2170 associated with the financial entity may attach gift credit to the recipient's financial institution account (e.g., DDA, or credit account 2130 or P2P-specific account 2150). A gift credit recipient 2210 not associated with the financial entity 2210 may attach gift credit at the receiver's financial institution account 2190 at another partner financial institution if the account is registered and associated with the alias and/or the recipient 2210 may be prompted to register for the service and/or open an account with the financial institution in order to receive the gift credit from the gift credit provider 2010.

It should be appreciated that embodiments of the invention described above permit a gift credit provider to send gift credit to another entity even if the gift credit provider entity does not know any account information for the recipient entity and only knows a mobile telephone number or email address of the recipient entity. This can also result in better protection of personal account information. It should also be appreciated that some embodiments of the invention create a viral registration and/or account opening system that allows for customers of a financial institution to send gift credits to anyone outside the financial entity using an alias. In such embodiments, the non-customers are contacted using the alias and they are allowed to quickly open and/or register an account with the financial institution in order to attach the gift credit amounts sent from the gift credit provider.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for providing virtual gift credit, the method comprising:
   receiving from a gift provider, via a computing device, gift credit instructions that include a gift credit type, gift credit amount, and an alias associated with a gift recipient, wherein the gift credit type comprises one of a group consisting of one or more categories of merchants at which the gift credit amount is accepted and one or more types of product for which the gift credit amount can be applied;
   determining, by a computing device processor, that the alias is registered in an alias data repository with a pre-determined financial institution payment account held and designated by the gift recipient;
   in response to determining that the alias is registered with the financial institution payment account and prior to notifying the gift recipient of the gift credit, immediately attaching, by a computing device processor, the gift credit amount to the financial institution payment account;

in response to attaching the gift credit amount to the financial institution payment account, generating, by a computing device processor, and initiating electronic communication, via a computing device, of a gift credit notification to the gift recipient, wherein the gift credit notification includes the gift credit type, the gift credit amount and identification of the financial institution payment account to which the gift credit amount is attached; and in response to attaching the gift credit amount to the financial institution payment account, automatically applying, by a computing device processor, the gift credit amount to a purchase made against the financial institution payment account and of the gift credit type, wherein the gift credit amount is applied to the purchase absent the gift recipient (1) confirming receipt of the gift credit notification and (2) confirming the attachment of the gift credit amount to the payment account.

2. The method of claim 1, further comprising communicating, via a computing device, a gift credit application notification to the gift recipient, wherein the gift credit application notification notifies the gift recipient that at least a portion of the gift credit amount is being applied to the purchase.

3. The method of claim 1, wherein receiving further comprises receiving, via the computing device, the gift credit instructions that include a gift credit payment account identifier associated with a gift provider.

4. The method of claim 1, wherein receiving further comprises receiving, via the computing device, the gift credit instructions that include a personalized message for the gift recipient.

5. The method of claim 1, further comprising communicating, via a computing device, an alias registration request to the gift recipient if the alias is determined to not be registered with a payment account associated with the gift recipient, wherein the alias registration request provides instructions for registering the alias with a payment account.

6. The method of claim 1, wherein receiving further comprises receiving, via the computing device, the gift credit instructions that include the gift credit type, wherein the gift card type is further defined as one or more merchants at which the gift credit amount is accepted.

7. The method of claim 1, wherein receiving further comprises receiving, via the computing device, the gift credit instructions that include at least one of time restrictions for applying the gift credit amount or geographic restrictions for applying the gift credit amount.

8. The method of claim 1, wherein receiving further comprises receiving, via the computing device, the gift credit instructions that include the gift credit type, wherein the gift card type is further defined as generic gift credit that is accepted anywhere the payment account is accepted.

9. The method of claim 1, wherein determining further comprises determining, via the computing device processor, that the alias is registered with the financial institution payment account, wherein the financial institution payment account comprises one of a group consisting of a credit account, a debit account, a demand deposit account, a prepaid credit account, a line-of-credit account, a mortgage account, and a loan account.

10. The method of claim 1, further comprising receiving, via a computing device, from the gift recipient, a payment account change request that is configured to change attachment of the gift credit amount from the financial institution payment account to another financial institution payment account.

11. The method of claim 1, further comprising receiving, via a computing device, from the gift recipient, a gift credit type conversion request that is configured to convert the gift credit type to another gift credit type chosen by the gift recipient.

12. The method of claim 1, further comprising receiving, via a computing device, from the gift recipient, a gift credit cash-out request that is configured to convert the gift credit amount to a cash payment amount.

13. A system for providing virtual credit, the system comprising:

a computer apparatus including one or more processors and a memory;

an alias repository stored in the memory; and a virtual gift credit module stored in the memory, executable by the processors and configured to receive, from a gift provider, gift credit instructions that include gift credit type, gift credit amount and an alias associated with a gift recipient, wherein the gift credit type comprises one of a group consisting of one or more categories of merchants at which the gift credit amount is accepted and one or more types of product for which the gift credit amount can be applied;

a gift recipient account determination module stored in the memory, executable by one or more of the processors and configured to access the alias repository to determine that the alias is registered with a financial institution payment account held and designated by the gift recipient;

a gift credit attachment module stored in the memory, executable by one or more of the processors and configured to, in response to determining that the alias is registered with the financial institution payment account and prior to notifying the gift recipient of the gift credit, immediately attach the gift credit amount to the payment account; and a gift credit notification module stored in the memory, executable by one or more of the processors and configured to, in response to attaching the gift credit amount to the financial institution payment account, generate and initiate electronic communication of a gift credit notification to the gift recipient, wherein the gift credit notification includes the gift credit type, the gift credit amount and identification of the financial institution payment account to which the gift credit amount is attached, wherein, once attached to the financial institution account, the gift credit amount to applied to a purchase made against the financial institution payment account and of the gift credit type, wherein the gift credit amount is applied to the purchase absent the gift recipient (1) confirming receipt of the gift credit notification and (2) confirming the attachment of the gift credit amount to the payment account.

14. The system of claim 13, wherein the gift credit module is further configured to generate and initiate communication of a gift credit application notification wherein the gift credit application notification notifies the gift recipient that at least a portion of the gift credit amount is being applied to the purchase.

15. The system of claim 13, wherein the gift credit module is further configured to receive the gift credit instructions that include a gift credit payment account identifier associated with a gift provider.

16. The system of claim 13, wherein the gift credit module is further configured to receive the gift credit instructions that include a personalized message for the gift recipient.

17. The system of claim 13, wherein the gift recipient account determination module is further configured to generate and initiate communication of an alias registration request to the gift recipient if the alias is determined to not be registered with a payment account associated with the gift recipient, wherein the alias registration request provides instructions for registering the alias with a payment account.

18. The system of claim 13, wherein gift credit module is further configured to receive the gift credit instructions that include the gift credit type, wherein the gift card type is further defined as one or more merchants at which the gift credit amount is accepted.

19. The system of claim 13, wherein the gift credit module is further configured to receive the gift credit instructions that include at least one of time restrictions for applying the gift credit amount or geographic restrictions for applying the gift credit amount.

20. The system of claim 13, wherein the gift credit module is further configured to receive the gift credit instructions that include the gift credit type, wherein the gift card type is further defined as generic gift credit that is accepted anywhere the payment account is accepted.

21. The system of claim 13, wherein the gift recipient account determination module is configured to determine that the alias is registered with the financial institution payment account, wherein the payment account one of a group consisting of a credit account, a debit account, a demand deposit account, a prepaid credit account, a line-of-credit account, a mortgage account, and a loan account.

22. The system of claim 13, wherein the gift credit attachment module is further configured to receive, from the gift recipient, a payment account change request that is configured to change attachment of the gift credit amount from the financial institution payment account to another financial institution payment account.

23. The system of claim 13, wherein the gift credit module is further configured to receive, from the gift recipient, a gift credit type conversion request that is configured to convert the gift credit type to another gift credit type chosen by the gift recipient.

24. The system of claim 13, wherein the gift credit module is further configured to receive from the gift recipient, a gift credit cash-out request that is configured to convert the gift credit amount to a cash pay-out amount.

25. A computer program product, the computer program product comprising a non-transitory computer-readable medium having computer-executable instructions to cause a computer to implement the steps of:
receiving, from a gift provider, gift credit instructions that include a gift credit type, gift credit amount and an alias associated with a gift recipient, wherein the gift credit type comprises one of a group consisting of one or more categories of merchants at which the gift credit amount is accepted and one or more types of product for which the gift credit amount can be applied;
determining that the alias is registered in an alias data repository with a predetermined financial institution payment account held and designated by the gift recipient;
in response to determining that the alias is registered with the financial institution payment account and prior to notifying the gift recipient of the gift credit, immediately attaching the gift credit amount to the financial institution payment account;
in response to attaching the gift credit amount to the financial institution payment account, generating and initiating electronic communication of a gift credit notification to the gift recipient, wherein the gift credit notification includes the gift credit type, the gift credit amount and identification of the financial institution payment account to which the gift credit amount is attached; and
in response to attaching the gift credit amount to the financial institution payment account, automatically applying the gift credit amount to a purchase made against the financial institution payment account and of the gift credit type, wherein the gift credit amount is applied to the purchase absent the gift recipient (1) confirming receipt of the gift credit notification and (2) confirming the attachment of the gift credit amount to the payment account.

26. The computer program product of claim 25, wherein the computer-executable instructions cause the computer to implement the step of communicating a gift credit application notification to the gift recipient, wherein the gift credit application notification notifies the gift recipient that at least a portion of the gift credit amount is being applied to the purchase.

27. The computer program product of claim 25, wherein the step of receiving further comprises receiving the gift credit instructions that include a gift credit payment account identifier associated with a gift provider.

28. The computer program product of claim 25, wherein the step of receiving further comprises receiving the gift credit instructions that include a personalized message for the gift recipient.

29. The computer program product of claim 25, wherein the computer-executable instructions cause the computer to implement the step of communicating an alias registration request to the gift recipient if the alias is determined to not be registered with a payment account associated with the gift recipient, wherein the alias registration request provides instructions for registering the alias with a payment account.

30. The computer program product of claim 25, wherein the step of receiving further comprises receiving the gift credit instructions that include the gift credit type, wherein the gift card type is further defined as one or more merchants at which the gift credit amount is accepted.

31. The computer program product of claim 25, wherein the step of receiving further comprises receiving the gift credit instructions that include at least one of time restrictions for applying the gift credit amount or geographic restrictions for applying the gift credit amount.

32. The computer program product of claim 25, wherein the step of receiving further comprises receiving the gift credit instructions that include the gift credit type, wherein the gift card type is further defined as generic gift credit that is accepted anywhere the payment account is accepted.

33. The computer program product of claim 25, wherein the step of determining further comprises determining that the alias is registered with the financial institution payment account, wherein the payment account one of a group consisting of a credit account, a debit account, a demand deposit account, a prepaid credit account, a line-of-credit account, a mortgage account, and a loan account.

34. The computer program product of claim 25, wherein the computer-executable instructions cause the computer to implement the step of receiving a payment account change request that is configured to change attachment of the gift credit amount from the financial institution payment account to another financial institution payment account.

35. The computer program product of claim 25, wherein the computer-executable instructions cause the computer to implement the step of receiving a gift credit type conversion request that is configured to convert the gift credit type to another gift credit type chosen by the gift recipient.

36. The computer program product of claim 25, wherein the computer-executable instructions cause the computer to implement the step of receiving a gift credit cash-out request that is configured to convert the gift credit amount to a cash payment amount.

\* \* \* \* \*